H. K. PARKER & J. T. NUSBAUM.
COMBINED BUTTER AND EGG CASE.
APPLICATION FILED MAR. 4, 1914.
1,163,363.
Patented Dec. 7, 1915.
2 SHEETS—SHEET 1.
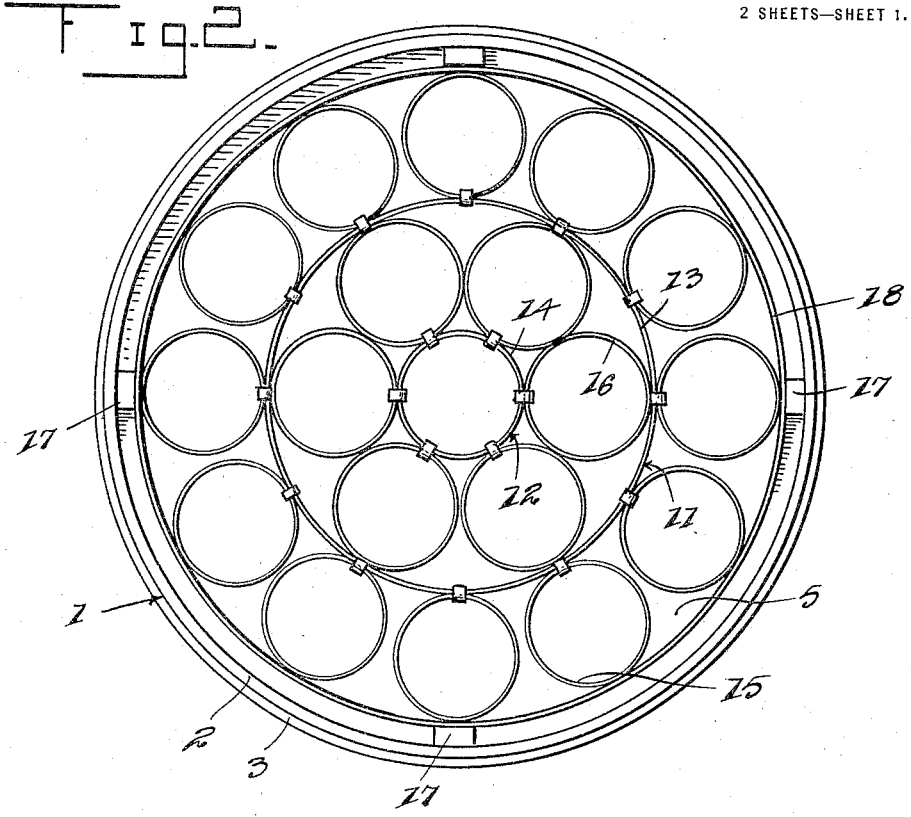
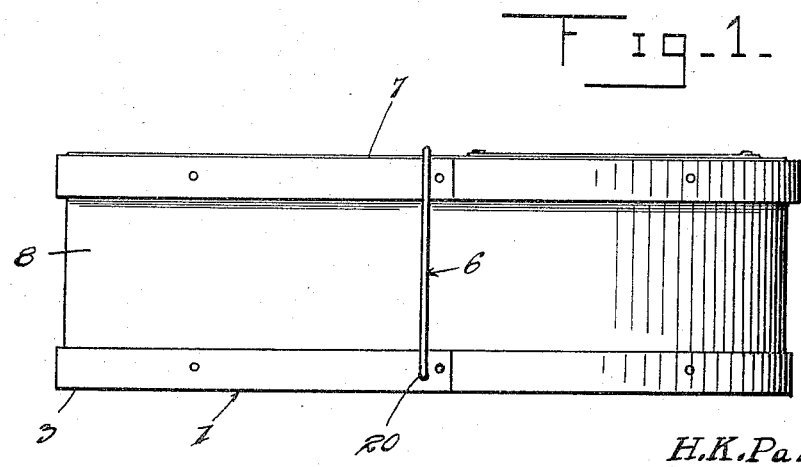
Witnesses
C. A. Beall.
Inventors
H. K. Parker
J. T. Nusbaum.
By Randolph Jr.
Attorney
COLUMBIA PLANOGRAPH CO., WASHINGTON, D. C.

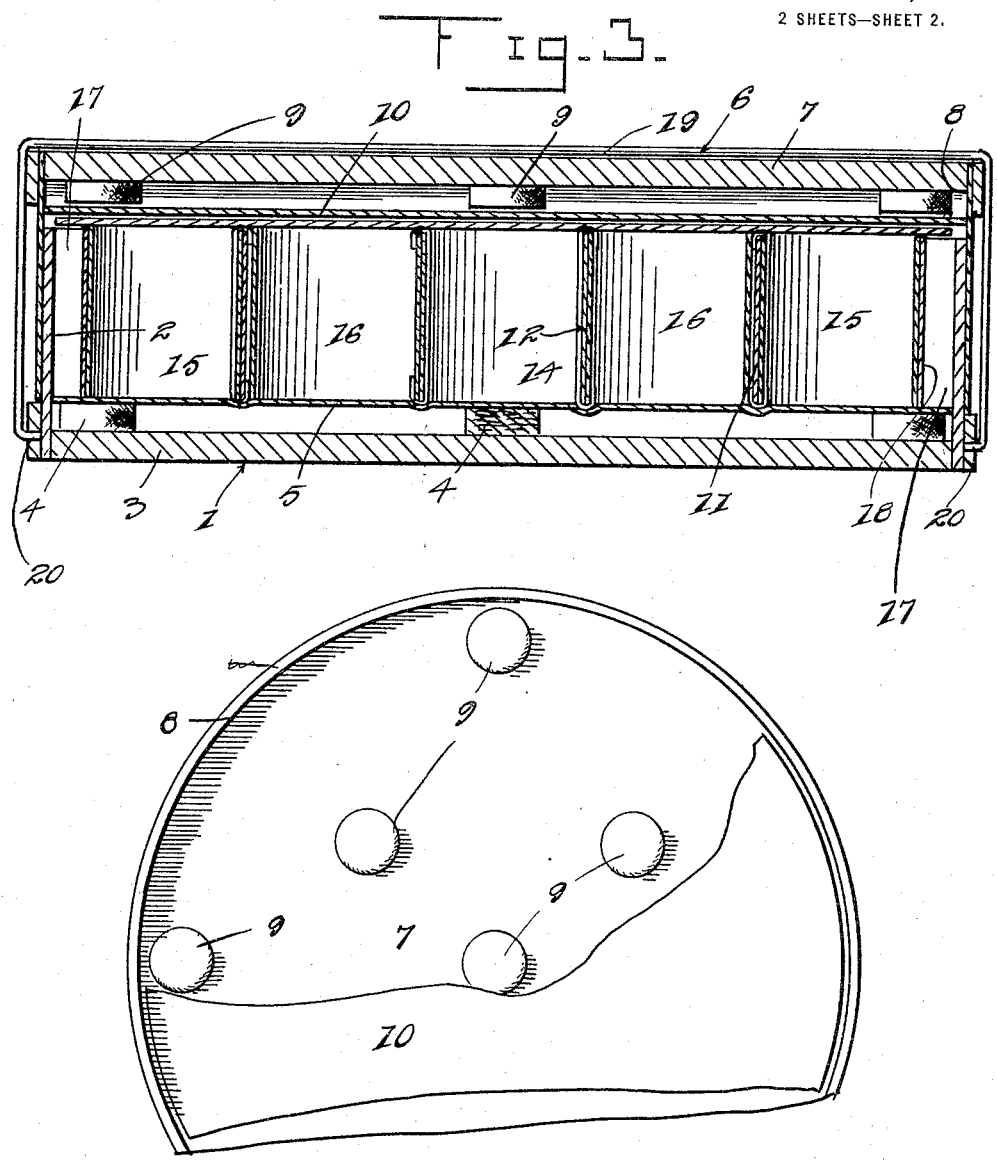

UNITED STATES PATENT OFFICE.

HENRY K. PARKER AND JERRY T. NUSBAUM, OF WAGONER, OKLAHOMA.

COMBINED BUTTER AND EGG CASE.

1,163,363.  Specification of Letters Patent.  Patented Dec. 7, 1915.

Application filed March 4, 1914. Serial No. 822,440.

*To all whom it may concern:*

Be it known that we, HENRY K. PARKER and JERRY T. NUSBAUM, citizens of the United States, residing at Wagoner, in the county of Wagoner and State of Oklahoma, have invented certain new and useful Improvements in Combined Butter and Egg Cases; and we do hereby declare the following to be a full, clear, and exact description of the invention, such as will enable others skilled in the art to which it appertains to make and use the same.

This invention relates to new and useful improvements in combined butter and egg cases, and has for its principal object to provide a device wherein both butter and eggs may be shipped in the same case and at the same time.

Another object of the invention is to provide a device wherein it is possible to fill the device entirely with eggs and use the same in the ordinary way.

A further object of the invention is to provide a case wherein the eggs are cushioned and held spaced from the side walls and top and bottom walls thereof to prevent any danger of breaking during shipment.

A still further object of the invention is to provide a simple and effective device by means of which the above mentioned objects may be accomplished and with which it is possible to increase or decrease the number of eggs to be shipped and hold the same safely at the desire of the user.

With these and other objects in view, the invention consists in the novel combination and arrangement of parts which will be fully set forth in the following specification and accompanying drawings, in which, Figure 1 is a side view in elevation of an egg case constructed in accordance with this invention, Fig. 2 is a top plan view of an egg case constructed in accordance with this invention showing the cover removed, Fig. 3 is a transverse sectional view of this improved egg case, and Fig. 4 is a plan view of a portion of the top of the box showing a part of the false top broken away to illustrate the method of holding the same in spaced relation with the top.

Referring now to the drawings by characters of reference, the numeral 1 designates as an entirety an egg case constructed in accordance with this invention which comprises the cylindrical side walls 2 having secured at one edge the bottom 3. This bottom has provided at spaced intervals the disks 4 which are preferably of a soft resilient material, which are secured in any suitable manner to the bottom as clearly illustrated in Figs. 3 and 4. A suitable false bottom 5 which is preferably of cardboard or a similar flexible material, is provided and is supported from the disks 4 in spaced relation with the bottom 3 as clearly shown in Fig. 3. The top of the box which is designated generally by the numeral 6, comprises the disk 7 which forms the top member to which is secured the side walls 8 which are bent to conform to the contour of the disk 7 forming the top, and are arranged to fit the exterior of the walls 2, when the device is in use. A plurality of disks 9 which are formed of any suitable soft resilient material, are secured at spaced intervals to the top member 7 and are arranged to hold the flexible disk 10 forming the false top in spaced relation with the top 7. It will be clearly seen that when the two elements, namely the top and bottom, are together, a structure similar to a cheese box will be formed in which the filler elements which will be more fully hereinafter described, are adapted to be seated.

The filler elements above referred to, are designated generally by the numerals 11 and 12, and comprise the rings 13 and 14 which are of larger and smaller diameters respectively. The ring 13 above referred to, has secured thereto at spaced intervals, the rings 15 which are spaced from each other and arranged to form egg chambers for the reception of the eggs which are to be put in place. Each of these rings 15 is spaced from the adjacent ring as clearly shown in Fig. 2 and may be formed of any suitable material. Secured to the inner ring 14 are provided a plurality of rings 16 which are arranged to fit within the ring 13 and thereby provide a plurality of fillers for the space within the ring 13 when the device is in use. It will be evident that this construction will permit the inner ring to be removed when so desired and in that position, any desired material may be placed on the interior of the ring 13 and the case may still be used for the shipping of eggs.

At spaced intervals around the outer wall 2, of the bottom section of the case, is provided a plurality of spacing members 17 which are arranged to hold the cushioning rings 18 which surround the exterior of the larger element forming the egg receptacle, and is spaced from the outer wall 2 of the bottom portion of the case to prevent the egg chambers from coming in contact with the outer wall and thereby endangering the contents of the case. In order to hold the two sections together after the contents have been placed within the chambers, are preferably provided the U-shaped members 19, the ends of the arms of which are bent as at 20 and are adapted to enter the recesses at diametrically opposite points in the bottom element of the case.

It will be apparent from the foregoing that in use, the outer egg-receiving element 11 is placed in position within the bottom element 2 and the egg chambers 15 filled. It will be apparent that in this position, the central portions on the interior of the ring 13 may be arranged to receive butter or any similar product, or should it be so desired, the filler element 12 may be placed therein and eggs placed within the egg chambers 16. Owing to the construction of the top and bottom, it will be evident that the false bottom will take up any shocks and danger of the breakage of the contents will be eliminated.

While in the foregoing there has been shown and described the preferred embodiment of this invention, it is to be understood that such changes may be made in the combination and arrangement of parts as will fall within the spirit and scope of the invention as claimed.

Having thus described our invention, we claim:

An egg case comprising a bottom, said bottom being circular in plan, a circular wall secured to the periphery of the bottom and extending upwardly therefrom to form a cylindrical container, a cover removably secured to the container, means to hold the cover in place, spacing tabs secured to the bottom, spacing tabs secured to the top of the cover, vertically extending spacing strips secured to the side wall, a false bottom mounted on the spacing tabs, a plurality of egg cells supported on the false bottom, the walls of the cells slightly depressing the bottom and a false top resting on the upper edges of the walls of the cells and engaging the upper spacing tabs to hold the contents of the case away from the top and bottom walls thereof.

In testimony whereof we affix our signatures in presence of two witnesses.

HENRY K. PARKER.
JERRY T. NUSBAUM.

Witnesses:
CHARLES S. JONES,
W. A. STONE.

Copies of this patent may be obtained for five cents each, by addressing the "Commissioner of Patents, Washington, D. C."